United States Patent
Svrcek et al.

(10) Patent No.: US 9,338,842 B2
(45) Date of Patent: May 10, 2016

(54) PULSE SWITCHED RESISTOR DRIVER

(71) Applicant: Varroc Lighting Systems s.r.o., Senov u Noveho Jicina (CZ)

(72) Inventors: Martin Svrcek, Good (CZ); Jiri Kocian, Ostrava Vitkovice (CZ)

(73) Assignee: VARROC LIGHTING SYSTEMS, S.R.O. (CZ)

( * ) Notice: Subject to any disclaimer, the term of this patent is extended or adjusted under 35 U.S.C. 154(b) by 188 days.

(21) Appl. No.: 14/144,764

(22) Filed: Dec. 31, 2013

(65) Prior Publication Data

US 2014/0312790 A1    Oct. 23, 2014

(30) Foreign Application Priority Data

Apr. 22, 2013 (CS) .................. PV 2013-300

(51) Int. Cl.
| H05B 37/00 | (2006.01) |
| H05B 39/00 | (2006.01) |
| H05B 41/00 | (2006.01) |
| H05B 33/08 | (2006.01) |

(52) U.S. Cl.
CPC .................. H05B 33/0815 (2013.01)

(58) Field of Classification Search
USPC .......................... 315/186, 119, 210
See application file for complete search history.

(56) References Cited

U.S. PATENT DOCUMENTS

| 8,203,279 | B2 * | 6/2012 | Chen ............... | H05B 33/0818 315/185 S |
| 8,897,999 | B2 * | 11/2014 | Takeuchi ............ | G01V 21/32 340/988 |
| 9,018,859 | B2 * | 4/2015 | Hu ................... | H05B 33/0815 315/307 |
| 2010/0207547 | A1 | 8/2010 | Kuroki et al. | |
| 2011/0156605 | A1 * | 6/2011 | Ku ................... | H05B 33/0818 315/186 |
| 2014/0312790 | A1 * | 10/2014 | Svrcek ............ | H05B 33/0815 315/186 |
| 2014/0333428 | A1 * | 11/2014 | Markell ........... | B60Q 1/26 340/475 |

FOREIGN PATENT DOCUMENTS

| CN | 201557302 U | 8/2010 |
| CN | 102098826 A | 6/2011 |
| CN | 202014080 U | 10/2011 |
| CN | 202425108 U | 9/2012 |
| CN | 202435690 U | 9/2012 |
| CN | 202455590 U | 9/2012 |
| CN | 202713719 U | 1/2013 |
| GB | 2398682 A | 8/2004 |
| JP | 2003317978 A | 11/2003 |
| JP | 2005032579 A | 2/2005 |
| TW | 201129227 A | 8/2011 |

* cited by examiner

Primary Examiner — Adam Houston
(74) Attorney, Agent, or Firm — Cantor Colburn LLP

(57) ABSTRACT

Pulse switching controller for the LED lighting of the LED drive module for lamps in automobile applications provided with light sources having LED diodes and a drive module for the LED function and excitation, where the drive module (3) comprises at minimum one resistance regulator (38) working in pulse switching duty, which is connected by its input to the last cathode of the corresponding branch (33) of LED diodes and by its output to the input electrode of a switching element (37), which is connected by its output electrode to ground, while the controlling electrode of the switching element (37) is connected to the output of a pulse generator (36) with a set duty cycle in dependence on the input voltage, which is connected both by a sensor input to the input voltage from the input circuit (31) and by an external input (35).

11 Claims, 3 Drawing Sheets

PULSE SWITCHED RESISTOR DRIVER

CROSS-REFERENCES TO RELATED APPLICATIONS

This patent application claims priority to Czech Republic Patent Application Serial No. PV 2013-300 filed on Apr. 22, 2013, which is incorporated herein by reference in its entirety.

BACKGROUND OF THE INVENTION

The proposed invention relates to the headlights and lamps of an automobile comprising LED light sources. The light output of the headlights or lamps of automobiles, and hence the LED sources, must comply with definite legal and other requirements under various working conditions. This is provided by the LED drive module (LDM), which supplies the correct current to the LEDs and also ensures their protection.

The modern light sources of automobiles focus on optical performance, style and appearance, as well as modern technologies such as LED sources and the like. The design of these elements is as a result becoming increasingly more complex and complicated.

The driving or control of LEDs (light emitting diodes) is one of the main tasks in the electronic development. Current sources are used predominantly for the driving of individual LEDs, or LED strings or fields. Three main categories of these sources or regulators are customarily used: resistor, linear, and switching sources. Each of these architectures has its advantages and its disadvantages, relating especially to cost, efficiency, and functionality.

A resistor regulator is composed in particular of resistors hooked up in series with LED diodes. The main advantage of this solution is its low price and simplicity. The main disadvantage is that the regulator does not ensure a constant current, or light output, and it has low efficiency. The linear regulator already contains semiconductor components. This type of regulator is able to provide a constant current or light output in a defined range of input voltages and still at relatively low price. The drawback is its low efficiency. Switched sources are the most complex, being generally based on specialized integrated circuits. This type of regulator is able to provide a stable light output or current in a broad range of input voltages, it enables the driving of many interconnected LEDs, and it attains high efficiencies. The drawback is the high price and the complexity of the design.

The closest architecture to the proposed design is an application where the lamp control unit (Body Control Module—BCM) generates a pulse-width modulated (PWM) signal in dependence on the voltage in the automobile's network, which drives the lamp unit that is provided with a linear or a resistor source. The use of PWM in the BCM brings several disadvantages. In event of a malfunctioning of the PWM, the lamp unit is not protected against voltage surge, which leads to further expenses for its protection. The individual transfer characteristic of the PWM versus the input voltage is not defined according to the requirements of the given lamp unit (the same BCM is used for many automobiles), and the BCM in PWM mode may cause increased electromagnetic interference in view of the high pulse currents. The topologies when PWM is generated in the BCM do not allow a combination of current surge protection with the use of a switching transistor working in linear duty.

A specific solution making use of pulse generators with PWM, although with use of different characteristics or a different effect and function, is JP2003317978A, i.e., a design of the vehicle lighting by means of parallel strings with LED diodes, utilizing a pulse generator of PWM switching a transistor by width modulation, but controlled from the output terminal S across an input voltage detection circuit and by feedback obtained from the connected cathodes of the LED diodes, or US2011156605, where each string has its own switching MOSFET transistor controlled by a unit with PWM.

SUMMARY OF THE INVENTION

A pulse switching source for the LED lighting of the LED drive module for lamps in automobile applications provided with light sources having LED diodes and a drive module for the LED function and excitation is disclosed. The pulse switching source for the LED lighting of the LED drive module for lamps in automobile applications is provided with light sources having LED diodes and a drive module for the LED function and excitation, wherein the drive module comprises at least one resistance regulator working in pulse switching duty, which is connected by an input to the last cathode of a corresponding branch of the LED diodes and by an output to an input electrode of a switching element, which is connected by an output electrode to ground, while a controlling electrode of the switching element is connected to an output of a pulse generator with a set duty cycle in dependence on an input voltage from an input circuit, and the pulse generator with set duty cycle in dependence on the input voltage is connected both by a sensor input to the input voltage and by an external input to enable a plurality of lighting functions to an external signal, while an anode of a first diode in the string of the branch of LED diodes is connected to the input voltage.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
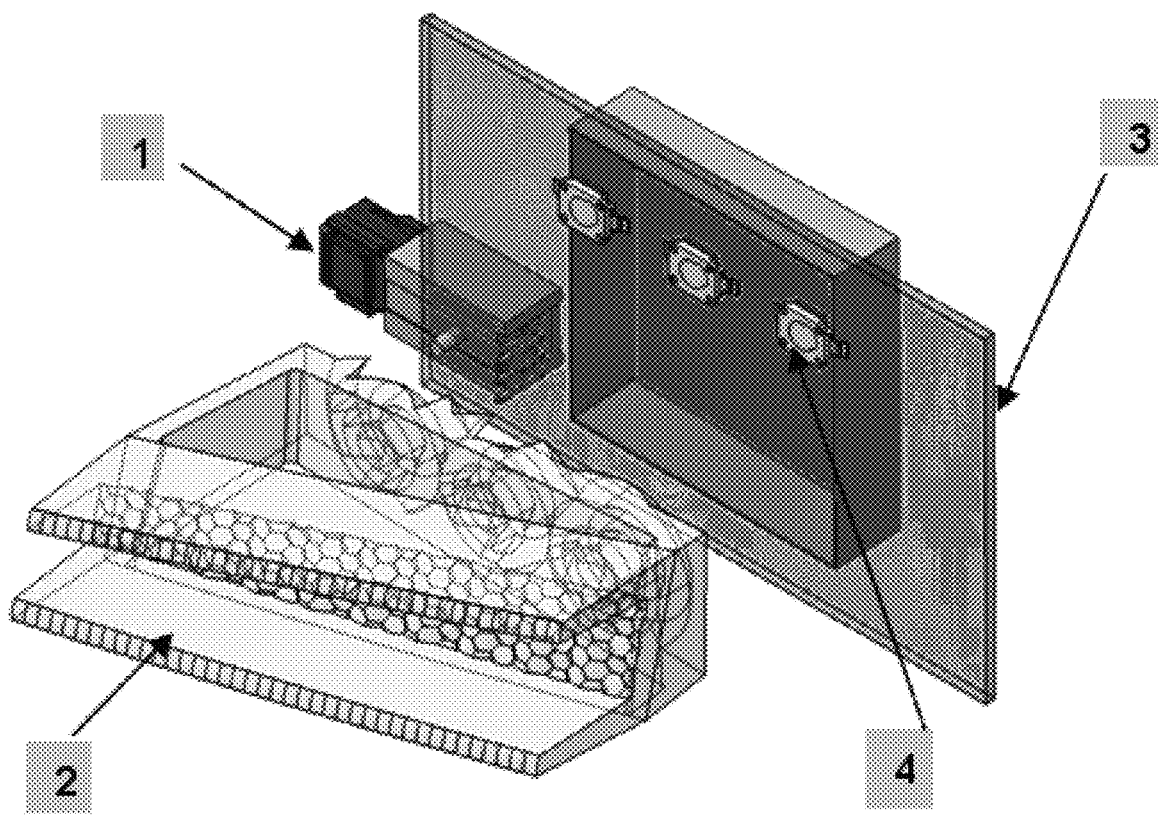
FIG. 1 shows a sample embodiment of the lighting function in an application of automobile lighting of a pulse switched controller for LED lighting of the LDM in the lamps in automotive applications provided with light sources with LED diodes and a drive module for the function and excitation of the LED diodes.
Figure 2:
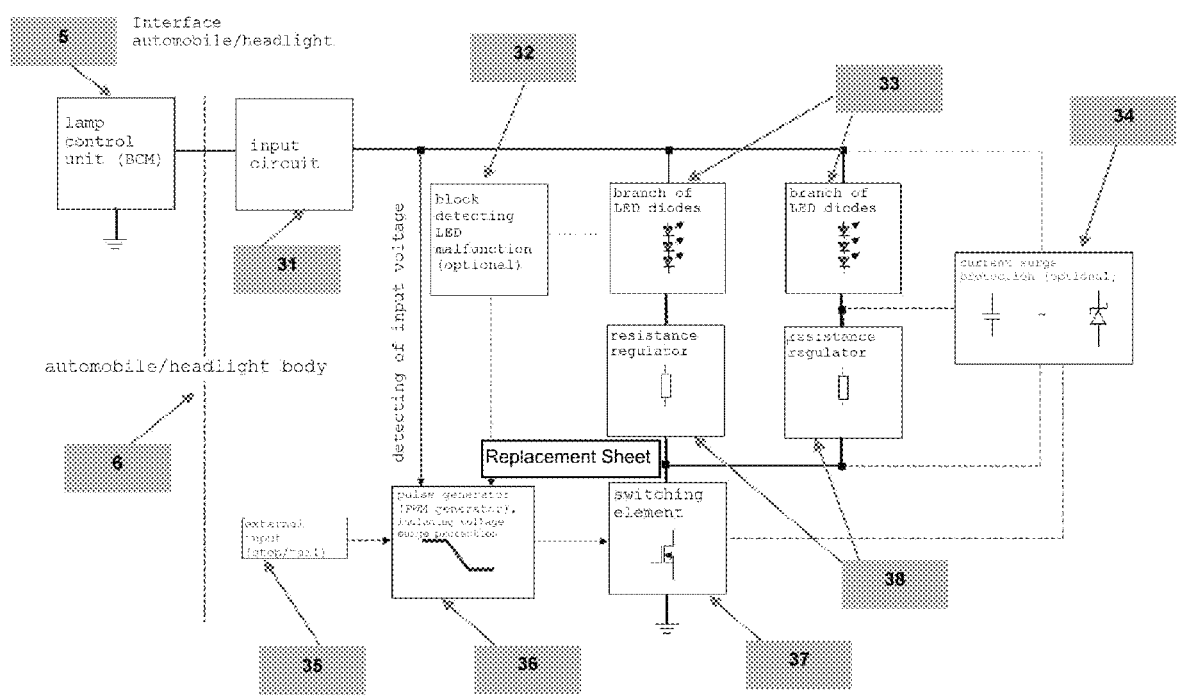
FIG. 2 is a block diagram of the proposed architecture of the LDM.
Figure 3:
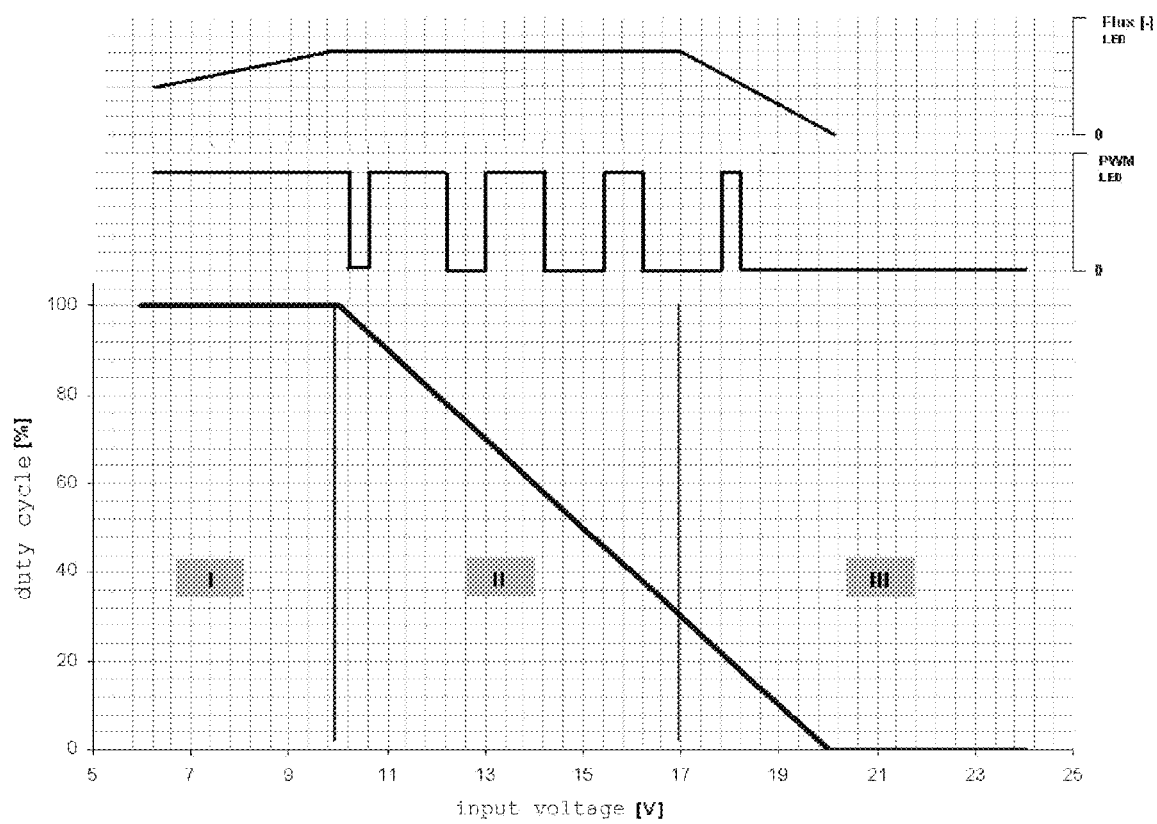
FIG. 3 shows the transfer function, or dependence of the duty factor on the input voltage.

Referring now to FIGS. 1-3, where the invention will be described with reference to specific embodiments, without limiting same. The mentioned drawbacks are eliminated to a large degree by the pulse switching controller or source for LED lighting of the LED drive module 3 in the lamps of automobile applications outfitted with light sources with LED diodes 4 and a drive module 3 for the function and excitation of the LEDs 4 according to the invention, whose essence is that the drive module 3 comprises at minimum one resistance regulator working in pulse switching duty, which is connected by its input to the last cathode of the corresponding branch of LED diodes 4 and by its output to the input electrode of a switching element 37, which is connected by its output electrode to ground, while the controlling electrode of the switching element 37 is connected to the output of a pulse generator 36 with a set duty cycle in dependence on the input voltage, and this pulse generator 36 with set duty cycle in dependence on the input voltage is connected both by a sensor input to the input voltage from the input circuit 31 and by an external input to enable a combination of lighting functions to an external signal, while the anode of the first diode in the string of the branch of LED diodes 4 is connected to the input voltage from the input circuit 31.

Another feature is that it comprises more than one series connection of resistance regulator and branch of LED diodes 4, while these series connections are connected by the anodes of the first LED diodes 4 in the string in the individual branches of LED diodes 4 to the input voltage from the input block and the outputs of all the resistance regulators are connected in common to the input electrode of the switching element 37, and a current surge protection is connected in parallel with the series connection of the branch or branches of LED diodes 4 and the resistance regulator, or the input for detecting a malfunction in the pulse generator 36 with set duty cycle in dependence on the input voltage is connected to a block for detection of malfunction of the LED diodes 4.

Another feature is that the switching element 37 is a unipolar transistor, or the switching element 37 is a bipolar transistor.

It is furthermore advantageous if the pulse generator 36 with a set duty cycle in dependence on the input voltage is a generator of a pulse width modulated signal.

It is furthermore advantageous if the pulse generator with a set duty cycle in dependence on the input voltage is a generator modulating the density of pulses.

It is furthermore advantageous if the switching element 37 and the pulse generator 36 is integrated in a semiconductor integrated circuit.

It is furthermore advantageous if the resistance regulator is partly or fully integrated in the input circuit 31.

It is furthermore advantageous if the resistance regulator is partly or fully integrated in the input wiring 39.

The proposed solution could point the way to a new architecture for a pulse switched controller for the LED lighting of the LED drive module 3, one which represents a compromise between price, functionality and efficiency. The architecture of this system is based on a combination of the properties of switched, linear and resistor regulators. The proposed design utilizes a pulse width generator (with an input voltage loop) integrated on the LDM, which together with the resistor regulator and supporting components ensures a constant light output in a defined range of input voltage.

The main advantage is the high efficiency and relatively low price. The circuit enables an easy defining of a different current in the individual LEDs when so required.

The pulse switched source for LED lighting of the LED drive module in the lamps in automotive applications provided with light sources with LED diodes and a drive module for the function and excitation of the LED diodes has a drive module 3, which contains at minimum one resistance regulator 38 working in pulse switched duty, which is connected by its input to the last cathode of the corresponding branch 33 of LED diodes and by its output to the input electrode of a switching element 37, which is connected by its output electrode to ground, while the controlling electrode of the switching element 37 is connected to the output of a pulse generator 36 with set duty cycle in dependence on the input voltage, and this pulse generator 36 with set duty cycle in dependence on the input voltage is connected both by a sensor input to the input voltage from an input circuit 31 and by an external input 35 to enable a combination of lighting functions to an external signal, while the anode of the first diode in the string of the branch 33 of LED diodes 4 is connected to the input voltage from the input circuit 31.

The pulse switched source can furthermore contain more than one series connection of resistance regulator 38 and branch 33 of LED diodes 4, while these series connections are connected by the anodes of the first LED diodes 4 in the string in the individual branches 33 of LED diodes 4 to the input voltage from the input block 31 and the outputs of all the resistance regulators 38 are connected in common to the input electrode of the switching element 37. A current surge protection 34 is connected in parallel with the series connection of the branch or branches of LED diodes 4 and the resistance regulator 38.

The input for detecting a malfunction in the pulse generator 36 with set duty cycle in dependence on the input voltage is connected to a block 32 for detection of malfunction of the LED diodes 4.

The switching element 37 is a unipolar transistor, or a bipolar transistor.

The pulse switched generator 36 with a set duty cycle in dependence on the input voltage is advantageously a generator of a pulse width modulated signal or a generator modulating the density of pulses.

The switching element 37 and the pulse generator 36 is advantageously integrated in a semiconductor integrated circuit.

The resistance regulator 38 is advantageously partly or fully integrated in the input circuit 31. The resistance regulator 38 is partly or fully integrated in the input wiring 39.

The drive module 3 in the proposed architecture ensures the required light output in a defined range of driving voltage. The core of the system is the pulse generator 36, which is part of the drive module 3. The circuits of the pulse generator 36 generate a pulse width modulated signal with a duty factor as defined by the transfer function of FIG. 3 in dependence on the input voltage. The pulse generator 36 periodically opens and closes the switching element 37, which together with the resistance regulator 38 ensures a constant light output in the defined range of the input voltage.

The transfer function in FIG. 3 can be divided into three main regions, depending on the input voltage. Region I represents the input voltage range where a constant light output is not strictly required, the current through the LED diodes 4 and thus also the light output is defined merely by means of the resistance regulator 38. The region II represents the input voltage range where the pulse generator 36 together with the resistance regulator 38 ensures approximately constant light output. The constant light output is possible thanks to the fact that the pulse generator 36 provides a variable duty factor of the input voltage for the resistance regulator 38 depending on the drive voltage that is driving the branches 33 of LED diodes 4 with a defined energy. The region III represents the input voltage range where the switching element 37 can work in the linear switched duty. The switching element 37 working in linear duty is able to reduce the current through the light emitting diodes 4 so that their limit values are not crossed.

FIG. 1 gives a sample embodiment of the lighting function comprising optical and electrical components responsible for generating the light in an automobile lighting application. The device consists of a main connector 1, an optical system 2, light emitting diodes 4 (LEDs for short) and a drive module 3. The main connector 1 represents the electronic input interface of the lamp. The lamp control unit 5 (BCM for short) ensures through the wiring of the automobile and the main connector 1 of the lamp a powering of the appropriate lighting function. The optical system 2 ensures a defined distribution of light from the light sources created by the light emitting diodes 4 for the required light beam. The light emitting diode 4 is an electronic semiconductor component which generates light. The light is generally generated in relation to the magnitude of the current through the LED diode 4. The drive module 3 is the electronic part responsible for driving the light sources created by the light emitting diodes 4.

FIG. 2 shows a block diagram of the proposed pulse switched source for LED lighting in automobile applications. The block diagram is composed of the following elements: the input circuit 31, the block 32 detecting LED malfunction, the branch or branches 33 of LED diodes 4, the current surge protection 34, the external input 35, the pulse generator 36, the switching element 37, the resistance regulator 38, the control unit 5 of the lamps in the automobile, and the automobile/headlight interface 6.

The input circuit 31 ensures protection of the lamp against external interfering electrical signals. The input circuit 31 in particular ensures protection against voltage peaks, protection against reverse polarity, it defines the input impedance, and so on. The block 32 for detecting LED malfunction constitutes circuits for detecting malfunction of the individual LED diodes 4 or their branches 33. A branch 33 of LED diodes 4 is composed of one or more LED diodes 4, hooked up in series or parallel arrangement. The external input 35 enables a combination of two or more functions (such as a stop/position light) integrated on the common drive module 3. The pulse generator 36 is the key component of the drive module 3. It generates a signal of pulse width modulation with a variable duty factor depending on the input voltage, as illustrated by FIG. 3. The frequency of this signal is chosen such as to limit the visible blinking of the individual LED diodes 4 that is discernible to the human eye, or $f_{PWM} \geq 70$ Hz. The switching element 37, such as a switching transistor, connects and disconnects the resistance regulator 38 according to the signal from the pulse generator 36. The resistance regulator 38 defines the current through the LED diodes 4. The current surge protection 34 represents circuits which ensure that the limit parameters of the particular LED diodes 4 will not be exceeded. For an input voltage higher than a defined threshold, the switching element 37 works partly in linear duty, so that the maximum current through the LED diodes 4 is not crossed. The lamp control unit 5 (or BCM) provides the driving voltage of the lamp to the main connector 1. The input wiring 39 can be realized by a resistance wire and thus can partially or fully replace the functions of the resistance regulator 38 and thereby ensure a distribution or total transfer of the power dissipation of the resistance regulator 38 to the supply wires.

FIG. 3 shows the transfer function describing the dependence of the duty factor of the generated PWM signal on the driving voltage. The light output of the light emitting diodes in the branches 33 of LED diodes depends on the current through these diodes. The resistance regulator 38 defines the current through the LED diodes 4 as a function of the driving voltage from the lamp control unit 5. In order to set a constant light output, the changes of the current in the LED diodes 4 must be compensated as a function of the input voltage. This can be achieved by a controlled switching, where the overall supplied energy to the branch 33 of LED diodes is constant. For this purpose, pulse width modulation (or PWM) is employed. The switching frequency must lie in the region that is not discernible to the human eye. And by using a controlled switching, one can achieve a subjectively constant perception of light in the working range of the input voltage. The use of pulse width modulation together with a resistance regulator 38 integrated in the drive module 3 can achieve a significant improvement in the area of efficiency or cooldown as compared to conventional linear or resistance regulators.

FIG. 3 defines three basic regions in dependence on the input voltage. Region I represents the range of input voltage functions where a constant light output is not strictly required. In this region, only the resistance regulator 38 determines the current through the light emitting diodes 4. Region II represents the range of input voltage functions where a constant light output is required. The variable duty factor of the pulse modulated signal compensates for the properties of the resistance regulator 38 in the manner described above. Region III represents the range of input voltage functions where the lamp function is not required, but it is useful to assure a protection of the electronics. This can be accomplished by a decrease in the duty factor of the PWM signal, or by implementing a dedicated current surge protection 34. In this case, the maximum current through the light emitting diodes 4 is limited by the switching element 37, also working partly in linear duty. This kind of protection overcomes one of the main drawbacks of the PWM solution, which is the high pulse current through the light emitting diodes 4 in the upper range of operating voltages. The use of this method of protection does not noticeably increase the demands on the parameters of the switching transistor or the cooling surface, since the power dissipation is only reduced for the period when the PWM is at high level.

The adoption of these electronic systems will allow for increased safety, serviceability and reliability in automotive engineering, since the control systems alone ensure optimal operation of the vehicle lights as fundamental and indispensable components of optimal automobile operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A pulse switching source for the LED lighting of the LED drive module for lamps in automobile applications provided with light sources having LED diodes and a drive module for the LED function and excitation, wherein the drive module comprises at least one resistance regulator working in pulse switching duty, which is connected by an input to the last cathode of a corresponding branch of the LED diodes and by an output to an input electrode of a switching element, which is connected by an output electrode to ground, while a controlling electrode of the switching element is connected to an output of a pulse generator with a set duty cycle in dependence on an input voltage from an input circuit, and the pulse generator with set duty cycle in dependence on the input voltage is connected both by a sensor input to the input voltage and by an external input to enable a plurality of lighting functions to an external signal, while an anode of a first diode in the string of the branch of LED diodes is connected to the input voltage.

2. The pulse switching source according to claim 1, wherein the pulse switching source comprises more than one series connection of the resistance regulator and the branch of the LED diodes, while these series connections are connected by the anodes of the first LED diodes in the string in the individual branches of LED diodes to the input voltage and the outputs of all the resistance regulators are connected in common to the input electrode of the switching element.

3. The pulse switching source according to claim 1, further comprising a current surge protection is connected in parallel with the series connection of the branch and the resistance regulator.

4. The pulse switching source according to claim 1, wherein an input for detecting a malfunction in the pulse generator with set duty cycle in dependence on the input voltage is connected to a block for detection of the malfunction of the LED diodes.

5. The pulse switching source according to claim 1, wherein the switching element is a unipolar transistor.

6. The pulse switching source according to claim 1, wherein the switching element is a bipolar transistor.

7. The pulse switching source according to claim 1, wherein pulse generator with a set duty cycle in dependence on the input voltage is a generator of a pulse width modulated signal.

8. The pulse switching source according to claim 1, wherein the pulse generator with a set duty cycle in dependence on the input voltage is a generator which modulates the density of the pulses.

9. The pulse switching source according to claim 1, wherein the switching element and the pulse generator is are integrated in a semiconductor integrated circuit.

10. The pulse switching source according to claim 1, wherein the resistance regulator is partly or fully integrated in the input circuit.

11. The pulse switching source according to claim 1, wherein the resistance regulator is partly or fully integrated into input wiring.

\* \* \* \* \*